United States Patent [19]

Simone

[11] Patent Number: 5,072,599
[45] Date of Patent: Dec. 17, 1991

[54] AIR TUBE CONTROL FOR FROZEN DESSERT MACHINE

[76] Inventor: John J. Simone, 69 W. Long Dr., Lawrenceville, N.J. 08648

[21] Appl. No.: 668,940

[22] Filed: Mar. 13, 1991

[51] Int. Cl.5 .............................................. F25C 1/20
[52] U.S. Cl. ...................... 62/308; 137/897; 137/625.3; 251/121; 251/205; 261/62
[58] Field of Search .................. 62/308; 137/896, 897, 137/625.3, 625.33; 251/121, 205; 261/62

[56] References Cited

U.S. PATENT DOCUMENTS

| | | | |
|---|---|---|---|
| 3,019,615 | 2/1962 | Moser | 251/205 X |
| 3,898,585 | 8/1975 | Erickson | 62/135 |
| 4,045,976 | 9/1977 | Mills | 62/308 |
| 4,412,428 | 11/1983 | Giannella et al. | 62/308 |
| 4,549,813 | 10/1985 | Volz et al. | 137/897 X |
| 4,617,802 | 10/1986 | Fielder | 62/125 |
| 4,696,417 | 9/1987 | Ugolini | 137/896 X |
| 4,831,839 | 5/1989 | Anderson et al. | 62/308 |
| 4,850,250 | 7/1989 | Mills | 62/308 |

OTHER PUBLICATIONS

Owners Manual for the Taylor Freezemaster 750 Series, on pp. 17 and 21.

Primary Examiner—William E. Tapolcai
Attorney, Agent, or Firm—Kenneth P. Glynn

[57] ABSTRACT

The present invention is directed toward an air and liquid product flow control element that can be adjusted to vary the flow of liquid dessert product and ambient air into the freezing chamber of a frozen confectionery dispensing machine. The invention is an air tube with a varied opening on its circumferential skin near one end, and a moveable sleeve that fits around the air tube. The air tube is positioned in the reservoir of liquid dessert product with its varied opening being submersed into the liquid. The air tube connects the freeze chamber with the ambient air above the liquid reservoir and allows liquid to flow through the varied opening into the freeze chamber.

The moveable sleeve that fits around the air tube extends from the ambient air above the liquid reservoir, down to the varied opening. By moving the sleeve up and down along the air tube, the sleeve blocks part or all of the varied opening. This allows a user to adjust the amount of liquid flow into the freeze chamber without having to reposition or remove the air tube. The amount of liquid and air can then be adjusted so that the dispensing machine is always operating at its most efficient air/liquid mixture, regardless of the rate at which the final product is extracted. The present invention thus shows a device that is easily retrofitted into existing machines and is more efficient, manufacturable and effective than any other shown in prior art.

18 Claims, 3 Drawing Sheets

AIR TUBE CONTROL FOR FROZEN DESSERT MACHINE

BACKGROUND OF THE INVENTION

1. Field of the Invention

The present invention is directed toward an air and liquid flow control that regulates the flow of air and a liquid dessert product into the freezing chamber of a frozen dessert dispensing machine. More particularly, the claimed invention allows a user to control the volume of liquid flow into the freezing chamber of the dispensing machine, allowing the machine to operate more efficiently and produce a higher quality product.

2. Prior Art Statement

"Soft" ice cream dispensing machines were developed shortly after the introduction of electrically powered refrigeration. Such machines can be used to make and dispense such soft confectionery products as aerated ice cream, custard, milk shakes, frozen yogurt, or other similar partially frozen dessert products. Most all machines designed to dispense soft confectionery products operate in the same manner. Positioned above a freezing chamber is a reservoir that contains the desired dessert product in liquid form. Air and the liquid product are then selectively introduced into the freezing chamber where they are whipped until frozen, the result being an aerated frozen product, or what is commonly called a "soft" frozen dessert.

The freezing chamber can only freeze a small amount of liquid material in a given time. Consequently, the amount of liquid product introduced into the freezing chamber must be regulated, in view of the capacity of the machine and the rate by which frozen product is finally dispensed. For example, during a hot summer day a frozen dessert machine may be constantly in use, so the flow of liquid product into the freezing chamber would be at a maximum. Conversely, on a cold winter day, the frozen dessert machine may not be used at all and the flow of new liquid product into the freezing chamber would be stopped.

When too much liquid is permitted to enter the freezing chamber, the dispensing machine must run for a long period of time to freeze the product. Since the freezing chamber is overfull, the resultant product may not be properly mixed with air. The lack of proper aeration may result in a product that may be grainy in texture, lack proper taste, and not stand up properly on a cone or in a cup. The machine must then be emptied and reprimed with a new mix of product.

In many frozen confectionery dispensing machines, the device that regulates the amount of liquid and air that enters the freezing chamber are combined into one piece, commonly called an "air tube". The air tube is hollow and extends from the freezing chamber, through the liquid product reservoir, and into the open air. The air tube also has an orifice in its circumferential skin that allows liquid product from the reservoir to enter. As gravity makes the liquid product flow through the orifice, into the air tube, and into the freezing chamber, air is also drawn from above the reservoir. Many variations on the design of the air tube exist in prior art, showing that the regulation of flow of air and liquid into a freezing chamber is a long-standing concern. The prior art that shows inventions that control the flow through such air tubes are as follows:

In the Owner's Manual for the Taylor Freezemaster 750 Series, frozen confectionery dispensing machine, on pages 17 and 21, the air tube design is shown and described. The air tube used has one orifice on its circumferential surface near one end. The air tube is reversible. When the orifice end of the air tube is placed in the bottom of the liquid product reservoir, the liquid flows into the freeze chamber at one uncontrolled rate. When the air tube is inverted, no liquid can flow into the freeze chamber. This system is both inefficient and unsanitary. With the air tube so positioned, so that liquid flows into the freeze chamber, the freeze chamber, if not in constant use, quickly fills with liquid. To stop the flow of liquid into the freeze chamber, a user must put his/her hand into the liquid product, grab the air tube, remove it, invert it and replace it into position. This procedure contaminates the liquid product, which is eventually consumed. During off-peak seasons, the air tube may have to be inverted almost once an hour, causing sever contamination to the liquid product and requiring the user to expend a great deal of time and effort. Additionally, as the air tube is being removed and inverted, the flow of liquid into the freeze chamber is unchecked, flooding the freeze chamber until the air tube is replaced. The excess product must then be removed and discarded from the freeze chamber, resulting in waste and inefficiency.

U.S. Pat. Nos. 4,045,976 to Mills; 4,329,853 to Mills; and 4,850,250 to Mills all show air tubes with various configurations and baffles that permit the smooth flow of both liquid and air through the air tube. None of the aforementioned Mills patents provide a device to selectively and variably control the flow of the liquid into the air tube.

U.S. Pat. No. 4,831,839 to Anderson et al shows as valve arrangement that prevents the overflow of liquid product into the freeze chamber. This arrangement is not variable and has very limited versatility.

U.S. Pat. No. 4,412,428 to Giannella shows a valve system operated through cam action by the rotation of the mixing mechanism. This system is complex, expensive, requires maintenance, is not easily retrofitted into existing machines, and requires parts to wear while in the presence of a consumed food product.

U.S. Pat. Nos. 3,898,858 to Erickson and 4,617,802 to Fiedler show air tube valves that are varied by floats in the liquid product. This requires that a large volume of liquid product be stored on the machine, which may result in the spoilage of the product (which is usually dairy) and waste.

Thus, although prior art does exist that shows a plurality of mechanisms and configurations for controlling the air/liquid flow in a frozen confectionery dispensing machine, prior art neither teaches nor suggests the air tube control device claimed herein that provides an efficient and sanitary flow control that is both variable and easily retrofitted onto existing dispensing equipment.

SUMMARY OF THE INVENTION

The present invention is directed toward an air and liquid product flow control element that can be adjusted to vary the flow of a liquid dessert product and ambient air into the freezing chamber of a frozen confectionery dispensing machine. The invention is an air tube with a varied opening on its circumferential skin near one end, and a movable sleeve that fits around the air tube. The air tube is positioned in the reservoir of liquid dessert product, with its varied opening being submerged into the liquid. The air tube connects the freeze chamber with the ambient air above the liquid reservoir and allows liquid to flow through the varied opening into the freeze chamber.

The moveable sleeve that fits around the air tube extends from the ambient air above the liquid reservoir, down to the varied opening. By moving the sleeve up and down along the air tube, the sleeve blocks part or all of the varied opening. This allows a user to adjust the amount of liquid flow into the freeze chamber without having to reposition or remove the air tube. The amount of liquid and air ca then be adjusted so that the dispensing machine is always operating at its most efficient air/liquid mixture, regardless of the rate at which the final product is extracted. The present invention thus shows a device that is easily retrofitted into existing machines and is more efficient, manufacturable and effective than any other shown in prior art.

BRIEF DESCRIPTION OF THE DRAWINGS

The invention will be more fully understood by referring to the following detailed specifications, the above specification and the claims set forth herein, when taken in connection with the drawings appended hereto, wherein:

DETAILED DESCRIPTION OF THE PRESENT INVENTION

The present invention is, as mentioned, directed toward an air and liquid flow device that regulates the flow of a liquid confectionery product and air into the freeze chamber of a dispensing machine. Most frozen confectionery dispensing machines have a simple design. A volume of liquid product is selectively released into a freeze chamber. The freeze chamber whips the liquid as it freezes, aerating the mixture until the end frozen product is between 25% to 50% air by volume. When the liquid product is frozen without the proper percentage of air, the end product may be gritty, have a poor flavor or have an unfavorable viscosity.

The problem with most frozen confectionery dispensing machines is that the rate of flow from the liquid reservoir into the freeze chamber is not adjustable. Consequently, all the liquid placed into the reservoir will flow into the freeze chamber. If few sales are made and the rate of frozen product discharged from the machine is less than the flow of liquid into the machine, the freeze chamber will quickly fill beyond its most efficient capacity, the result being that the end product will not be properly aerated and be of an inferior quality. In the past, the problem of freeze chamber "overfill" has been addressed in one of two ways. First, the operator may only put a small amount of liquid product into the machine at one time. This obviously prevents overfill, but it severely limits the capacity and efficiency of the machine by requiring long downtime periods while new batches of product are produced.

The second approach used to limit the overfill of the freeze chamber is by the use of valves or shut-off devices that selectively stop the flow from the liquid reservoir. Many such devices have elaborate workings, are expensive, and cannot be retrofitted into existing machines. Other devices require the user to actually reach into the liquid reservoir to operate the flow control. Such a technique contaminates the liquid product, causing an unnecessary unsanitary condition. The present invention shows an economical device that can be easily retrofitted onto most existing frozen confectionery dispensing machines. The present invention allows the rate of flow from the liquid reservoir to the freeze chamber to be infinitely varied by the user without problems of contamination. As such, the present invention will make frozen confectionery dispensing machines more efficient and allow them to create a higher quality product.

Figure 1:
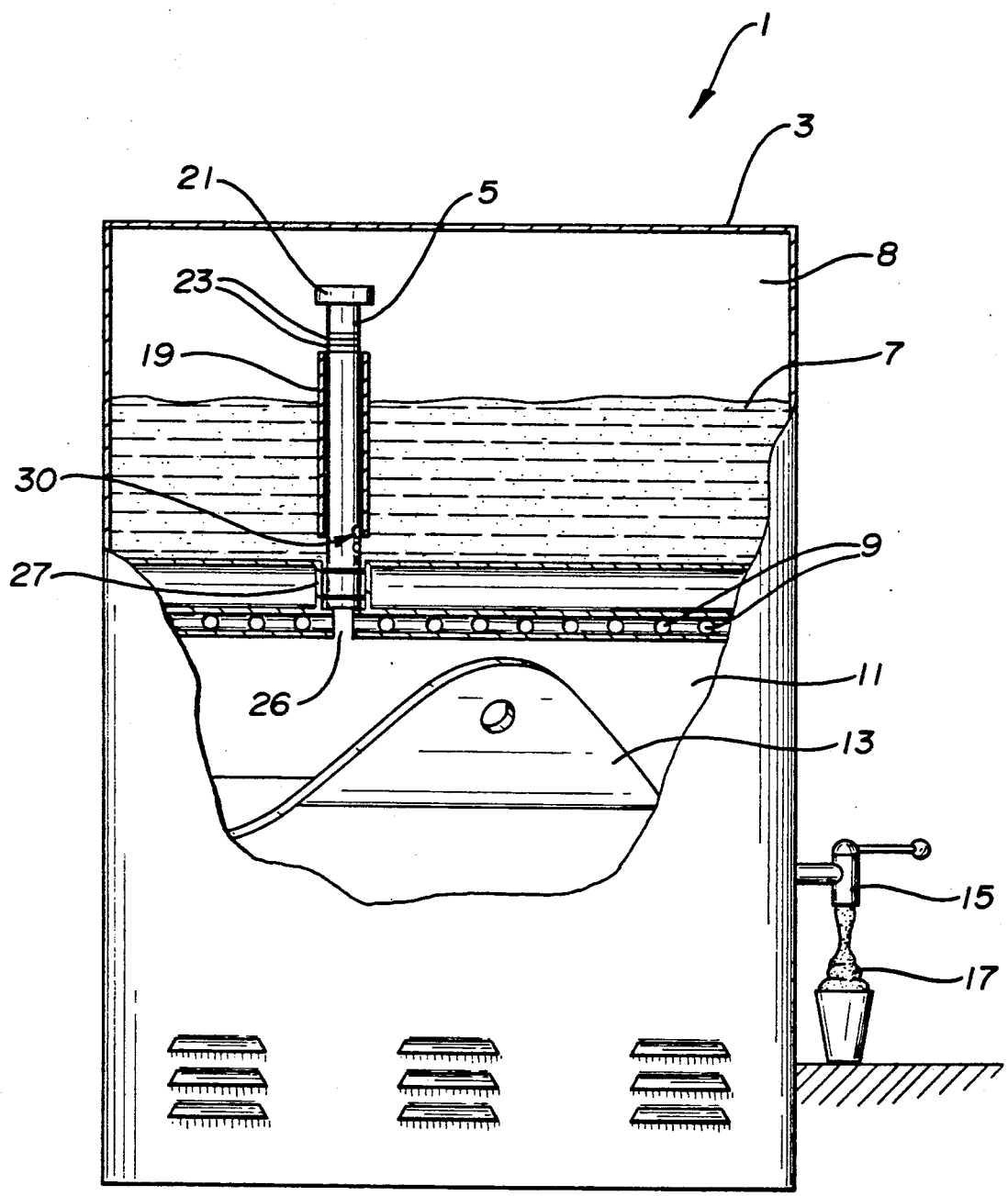
FIG. 1 shows a partially fragmented side view of one preferred embodiment to the present invention as it would appear positioned in a typical machine that dispenses frozen confectionery products.

Referring now to FIG. 1, a partially fragmented side view of a typical frozen confectionery dispensing machine 1 is shown. The dispensing machine 1 contains a liquid product reservoir 8 which holds a volume of liquid product 7. The liquid product can be ice cream, custard, yogurt, milk shake or other such products that are sold in a frozen or semi-frozen condition. The liquid product 7 is added to the reservoir 8 through any orifice formed on the top surface 3 of the dispensing machine 1.

Below the liquid product reservoir 8 is a freeze chamber 11, surrounded by refrigeration coils 9. Within the freeze chamber is a rotary dasher 13 that constantly mixes any liquids within the freeze chamber 11. The constant mixing of rotary dasher 13 whips the liquid 7 as it freezes, causing the frozen end product 17 to become aerated and maintain a 25% to 50% air content by volume. The rotary dasher 13 also forces the frozen end product 17 toward the release valve 15, where it is finally dispensed and sold to consumers.

The manner by which the liquid product 7 enters the freeze chamber 11 is the focus of the present invention. Shown by FIG. 1 is a side view of an air tube 5, surrounded by a sleeve 19 (shown in cross-section). The air tube 15 has an upper and a lower section. The air tube's 5 lower section seats in a cup-shaped flow channel 25 formed in the bottom of the liquid product reservoir 8. In the bottom of the flow channel 25 is an orifice 26 that enters the freeze chamber 11. The air tube 5 is hollow and air can flow directly into the freeze chamber 11 by passing through the air tube cap 21 and the air tube 5. Liquid product 7 can enter the freeze chamber 11 by flowing through the varied flow openings 30 formed into the air tube 5 on its lower section near the base of the liquid reservoir 8. The air tube 5 is surrounded in part by a predetermined length of sleeve 19. The sleeve 19 can be positioned by a user anywhere along the length of the air tube 15. When positioned over the varied flow opening 30, the sleeve can partially or entirely restrict the flow of liquid product 7 into the air tube 15. Indicia lines 23 are formed on the upper section of the air tube 15. The indicia lines inform the user where the sleeve 19 is located and how much flow of liquid product 7 is being permitted.

Figure 2:
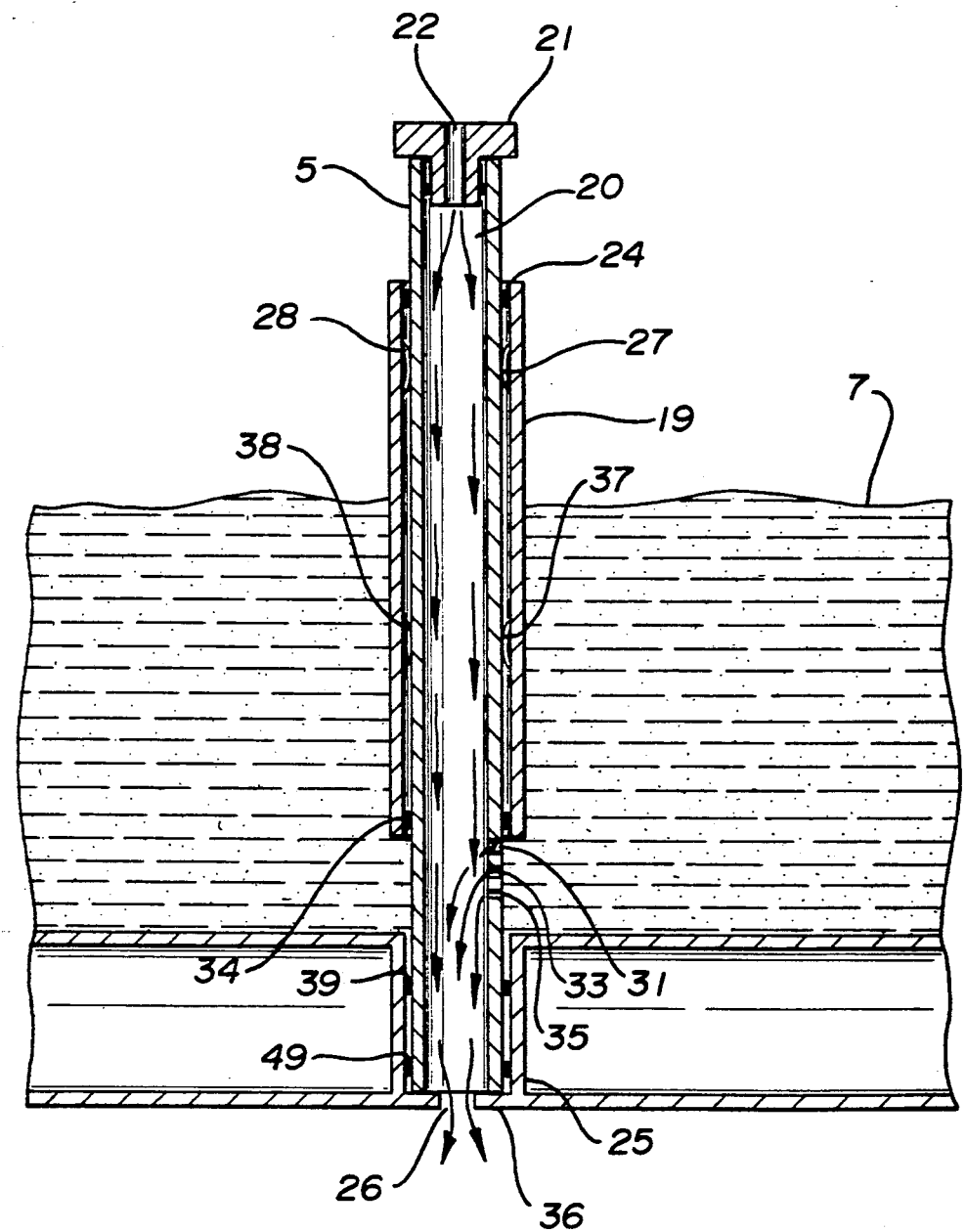
FIG. 2 shows a fully cross-sectioned close-up of the part of FIG. 1 that illustrates the claimed invention.

To better understand the present invention, refer to FIG. 2. FIG. 2 shows a fully enlarged cross-section of the present invention and the surrounding machine elements. As shown in FIG. 2, the air tube 5 has a longitudinal air passageway 20 transgressing its length. The air tube 5 has two sections, the lower section seating into a flow channel 27 formed into the bottom of the liquid product reservoir. The air tube's 5 vertical movement is restricted by contacting a lip 36 at the bottom of the flow channel 25. The movement of the air tube 5 is further restricted by the presence of two O-rings 39, 49 that seat onto the lower section of the air tube 5 and prevents the leakage of liquid product 7 into the flow channel 25 that acts as a seating cup.

Liquid product 7 flows into the air tube 5 forced by gravity. The lower section of the air tube 5 has a plurality of flow openings 31, 33, 35 formed within it. Although three flow openings 31, 33, 35 of varying sizes are shown in this embodiment, it should be understood that any plurality of openings can be used in any variety of sizes and dimensions. As liquid product 7 flows into the air tube 5, air is drawn into the air tube 5 through the air flow orifice 22 in the air tube cap 21. The air flow orifice 22 assures that only a limited supply of air will be drawn by the flow of liquid product down through the air tube 5 and into the freeze chamber.

Differing air tube caps 21 can be used, each with a different sized air flow orifice 22, to control the flow of air into the air tube 5. Many manufacturers of frozen confectionary dispensing machines believe that by varying the size of the air tube cap 21, the flow of liquid product 7 can be sufficiently controlled. In real use such air caps 21 do not adequately regulate the flow of liquid product 7, because such variables as temperature, humidity and mix proportion cause the viscosity of each batch to vary widely. The existing air tube caps 21 make no compensation for such variables.

Surrounding the air tube 5 is a predetermined length of sleeve 19. The sleeve 19 has a top and a bottom end. The sleeve 19 is movably held onto the air tube 5 through the use of a plurality of spring clips 27, 28, 37, 38 that can be attached to either the inside wall of the sleeve 19 or the outside wall of the air tube 5. Although four spring clips 27, 28, 37, 38 are shown, any plurality can be used. Additionally, the spring clips 27, 28, 37, 38 can be replaced by rubber seals 34, 24 or other 0-ring type, or mechanical friction devices that would cause substantial friction between the sleeve 19 and the air tube 5. As the sleeve 19 is pressed down along the air tube 5, the bottom end sleeve 19 eventually covers one, some or all of the flow openings 31, 33, 35. The top end of the sleeve 19 will always be above the maximum level of liquid product 7 in the reservoir. If a user wants to limit the flow of liquid product 7 into the freeze chamber, he/she would push the sleeve 19 down over the air tube 5. The sleeve's 19 bottom end seal would pass over the flow openings 31, 33, 35 one by one until the desired size opening remained. If an operator wanted to maximize the flow of liquid product 7 into the air tube 5, he/she would slide the sleeve 19 up on the air tube 5 until the bottom sleeve seal 34 completely cleared the last flow opening 31. An optional top seal 24 may be added to the invention to either replace the need of the spring clips 27, 28, 37, 38 or promote ease of cleaning by preventing liquid product 7 from going between the sleeve 19 and the air tube 5.

Figure 3:
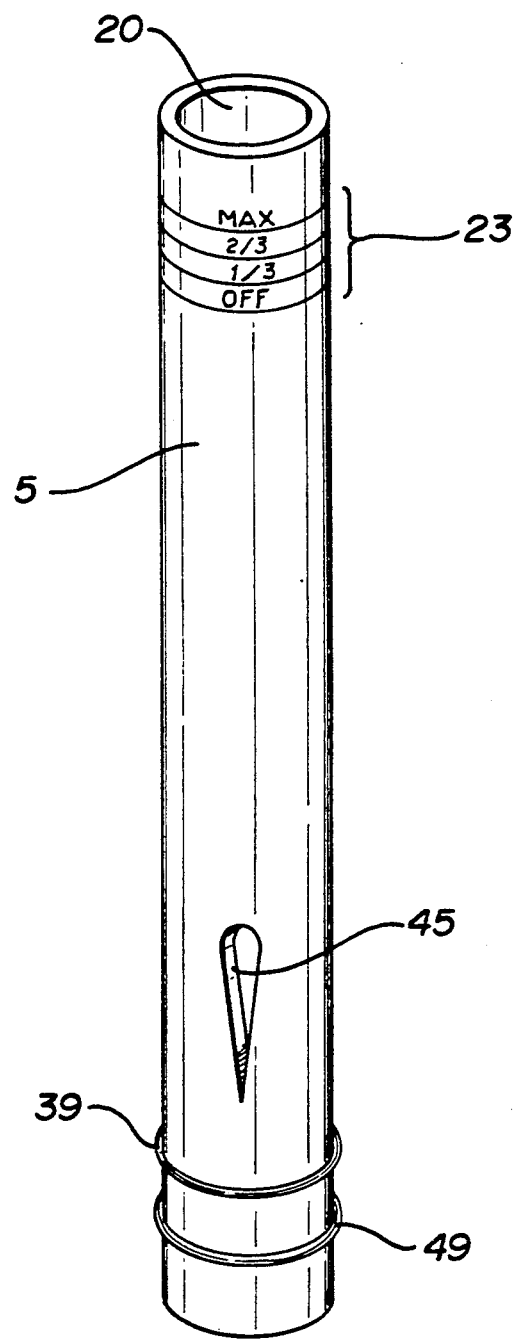
FIG. 3 shows a prospective view of a differing embodiment to the air tube part of the present invention.

Referring lastly to FIG. 3, an alternative embodiment to the air tube 5 portion of the present invention is shown. This figure best illustrates the indicia lines 23 that may be formed in or on the upper portion of the air tube 5. The indicia lines 23 would align with the top of the sleeve (not shown) to inform the user as to the amount of liquid product which is being allowed to flow into the air tube 5. The embodiment of FIG. 3 differs from that previously shown in FIGS. 1 and 2 because there is now only one flow opening 45. The flow opening 45 has one large end and tapers to a point. This embodiment allows the sleeve to infinitely control the flow of liquid product into the air tube 5 from a minimum amount of no-flow to a maximum amount of the area of the flow opening 45. It should also be understood that although a flow opening with a tapered point is shown, any shape can be used.

Obviously, numerous modifications, variations and combinations of the present invention are possible in light of the above teachings and illustrations. It is therefore understood that although the best modes of the present invention have been shown, within the scope of the appended claims the invention may be practiced other than as specifically described or shown herein.

What is claimed is:

1. In an apparatus for dispensing frozen confectionery products, including a freeze chamber, a liquid product reservoir and a flow channel connecting the freeze chamber with the reservoir, an improved flow device for controlling the flow of air and liquid into the freezing chamber from the liquid product reservoir; the device comprising:
    a) a tubular member having an upper and lower section with a longitudinal air passageway therethrough, said lower section being positioned within said flow channel submersed within said liquid product reservoir, and said upper section extending above the liquid held within said liquid product reservoir, said tubular member having at least one opening formed within the circumferential skin of said lower section, said opening allowing liquid to flow from said liquid product reservoir into said longitudinal air passageway;
    b) a tubular sleeve having two open ends, a top end and a bottom end, said sleeve fitting around and being movably positionable along said tubular member, said sleeve being capable of covering said openings on said lower section of said tubular member, blocking the flow of liquid from said liquid product reservoir into said longitudinal air passageway.

2. The device of claim 1 wherein at least one mechanical friction device holds said tubular sleeve in position along said tubular member.

3. The device of claim 1 wherein at least one liquid impermeable seal prevents liquid from passing said bottom end of said sleeve and coming between said tubular member and said sleeve.

4. The device of claim 3 wherein at least one liquid impermeable seal prevents liquid from passing said top end of said sleeve and coming between said tubular member and said sleeve.

5. The device of claim 1 wherein said tubular member is held within said flow channel by at least one liquid impermeable seal.

6. The device of claim 1 wherein said tubular member has a plurality of openings formed through its lower end.

7. The device of claim 6 wherein said plurality of openings are of various dimensions.

8. The device of claim 1 wherein said tubular member has one opening formed through its lower end.

9. The device of claim 8 wherein said opening widens as said opening approaches said upper section of said tubular member.

10. The device of claim 2 wherein said mechanical friction device is at least one spring clip attached to said sleeve that is biased against said tubular member.

11. The device of claim 1 wherein said upper section of said tubular member is marked with a plurality of indicia wherein the alignment of said top end of said sleeve with said indicia informs a user as to the position of said bottom end of said sleeve on said lower section of said tubular member.

12. The device of claim 1 wherein said tubular member is removable from said flow channel.

13. The device of claim 1 wherein said tubular sleeve is removable from said tubular member.

14. The device of claim 1 wherein said upper section of said tubular member terminates in a cap, said cap having an orifice therethrough, wherein said orifice limits to a predetermined amount the volume of air allowed to enter said longitudinal air passageway.

15. The device of claim 11 wherein said plurality of indicia correspond to the volume of flow from said liquid product reservoir to said longitudinal air passageway left unobstructed by said tubular sleeve.

16. The device of claim 1 wherein the flow of liquid between said liquid product reservoir and said longitudinal air passageway may be stopped by moving said tubular sleeve toward said lower section of said tubular member.

17. The device of claim 1 wherein the length of said tubular sleeve is greater that the maximum depth of liquid in said liquid product reservoir.

18. The device of claim 1 wherein said tubular sleeve can be held and moved along said tubular member by a user without the user having to contact the liquid within said liquid product reservoir.

* * * * *